US012135566B2

(12) United States Patent
Huang et al.

(10) Patent No.: US 12,135,566 B2
(45) Date of Patent: *Nov. 5, 2024

(54) SYSTEMS AND METHODS FOR ESTIMATING USER INTENT TO LAUNCH AUTONOMOUS AERIAL VEHICLE

(71) Applicant: Snap Inc., Santa Monica, CA (US)

(72) Inventors: Qiaokun Huang, Los Angeles, CA (US); Simon Saito Haagen Nielsen, Beverly Hills, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/215,665

(22) Filed: Jun. 28, 2023

(65) Prior Publication Data
US 2023/0341876 A1 Oct. 26, 2023

Related U.S. Application Data

(63) Continuation of application No. 16/294,597, filed on Mar. 6, 2019, now Pat. No. 11,822,346.
(Continued)

(51) Int. Cl.
*B64C 39/02* (2023.01)
*G05D 1/00* (2006.01)
(Continued)

(52) U.S. Cl.
CPC ............ *G05D 1/101* (2013.01); *B64C 39/024* (2013.01); *G05D 1/0016* (2013.01); *B64U 50/19* (2023.01);
(Continued)

(58) Field of Classification Search
CPC .... G05D 1/101; G05D 1/0016; B64C 39/024; B64C 2201/042; B64C 2201/08; B64C 2201/141; B64C 2201/146
(Continued)

(56) References Cited

U.S. PATENT DOCUMENTS 5,772,010 A * 6/1998 Watanabe ............... H01H 13/20
200/534
6,038,295 A 3/2000 Mattes
(Continued)

FOREIGN PATENT DOCUMENTS

CA 2887596 A1 7/2015

OTHER PUBLICATIONS

US 10,656,660 B1, 05/2020, Meisenholder et al. (withdrawn)
(Continued)

*Primary Examiner* — Richard A Goldman
(74) *Attorney, Agent, or Firm* — Schwegman Lundberg & Woessner, P.A.

(57) ABSTRACT

Detection of a launch event of an autonomous vehicle may consider input from a variety of sensors, including acceleration sensors and touch sensors In some aspects, a method includes receiving a first input from a touch sensor, receiving a second input from an accelerometer, determining whether a launch of the autonomous vehicle is detected based on the first input and the second input, and controlling the autonomous vehicle in response to the determining. In some aspects, when a launch is detected, a motor of the autonomous vehicle may be energized. By detecting a launch event in this manner, improved safety and reliability may be realized. A reduced occurrence of false positive launch events may reduce a risk that the motor of the autonomous vehicle is energized when the vehicle has not actually been launched.

17 Claims, 9 Drawing Sheets

Related U.S. Application Data

(60) Provisional application No. 62/639,280, filed on Mar. 6, 2018.

(51) Int. Cl.
*B64U 50/19* (2023.01)
*B64U 70/00* (2023.01)

(52) U.S. Cl.
CPC .......... *B64U 70/00* (2023.01); *B64U 2201/10* (2023.01); *B64U 2201/20* (2023.01)

(58) Field of Classification Search
USPC .......................................................... 701/3
See application file for complete search history.

(56) References Cited

U.S. PATENT DOCUMENTS

| | | | |
|---|---|---|---|
| 6,819,982 | B2 | 11/2004 | Doane |
| 6,980,909 | B2 | 12/2005 | Root et al. |
| 7,173,651 | B1 | 2/2007 | Knowles |
| 7,411,493 | B2 | 8/2008 | Smith |
| 7,535,890 | B2 | 5/2009 | Rojas |
| 7,542,073 | B2 | 6/2009 | Li et al. |
| 8,115,149 | B1* | 2/2012 | Manole .................. F42B 10/18 |
| | | | 244/45 R |
| 8,131,597 | B2 | 3/2012 | Hudetz |
| 8,174,562 | B2 | 5/2012 | Hartman |
| 8,199,747 | B2 | 6/2012 | Rojas et al. |
| 8,274,550 | B2 | 9/2012 | Steuart, III |
| 8,332,475 | B2 | 12/2012 | Rosen et al. |
| 8,646,720 | B2 | 2/2014 | Shaw |
| 8,718,333 | B2 | 5/2014 | Wolf et al. |
| 8,724,622 | B2 | 5/2014 | Rojas |
| 8,874,677 | B2 | 10/2014 | Rosen et al. |
| 8,909,679 | B2 | 12/2014 | Root et al. |
| 8,995,433 | B2 | 3/2015 | Rojas |
| 9,040,574 | B2 | 5/2015 | Wang et al. |
| 9,055,416 | B2 | 6/2015 | Rosen et al. |
| 9,100,806 | B2 | 8/2015 | Rosen et al. |
| 9,100,807 | B2 | 8/2015 | Rosen et al. |
| 9,191,776 | B2 | 11/2015 | Root et al. |
| 9,204,252 | B2 | 12/2015 | Root |
| 9,344,642 | B2 | 5/2016 | Niemi et al. |
| 9,345,711 | B2 | 5/2016 | Friedhoff |
| 9,443,227 | B2 | 9/2016 | Evans et al. |
| 9,471,059 | B1 | 10/2016 | Wilkins |
| 9,489,661 | B2 | 11/2016 | Evans et al. |
| 9,489,937 | B1 | 11/2016 | Beard et al. |
| 9,491,134 | B2 | 11/2016 | Rosen et al. |
| 9,576,369 | B2 | 2/2017 | Venkataraman et al. |
| 9,589,448 | B1 | 3/2017 | Schneider et al. |
| 9,681,046 | B2 | 6/2017 | Adsumilli et al. |
| 9,723,272 | B2 | 8/2017 | Lu et al. |
| 9,747,901 | B1 | 8/2017 | Gentry |
| 9,922,659 | B2 | 3/2018 | Bradlow et al. |
| 9,989,965 | B2 | 6/2018 | Cuban et al. |
| 10,061,328 | B2 | 8/2018 | Canoy et al. |
| 10,109,224 | B1 | 10/2018 | Ratti et al. |
| 10,140,987 | B2 | 11/2018 | Erickson et al. |
| 10,168,700 | B2 | 1/2019 | Gordon et al. |
| 10,234,872 | B2* | 3/2019 | Wang ..................... B64U 70/10 |
| 10,370,118 | B1 | 8/2019 | Nielsen et al. |
| 10,501,180 | B2 | 12/2019 | Yu |
| 10,768,639 | B1 | 9/2020 | Meisenholder et al. |
| 11,126,206 | B2 | 9/2021 | Meisenholder et al. |
| 11,407,511 | B1* | 8/2022 | Buchmueller ......... B64D 47/08 |
| 2007/0250526 | A1 | 10/2007 | Hanna |
| 2008/0255842 | A1 | 10/2008 | Simhi |
| 2009/0122133 | A1 | 5/2009 | Hartman |
| 2011/0202598 | A1 | 8/2011 | Evans et al. |
| 2012/0194420 | A1 | 8/2012 | Osterhout et al. |
| 2012/0209924 | A1 | 8/2012 | Evans et al. |
| 2012/0281885 | A1 | 11/2012 | Syrdal et al. |
| 2012/0287274 | A1 | 11/2012 | Bevirt |
| 2012/0316769 | A1* | 12/2012 | Gagliardi .............. B63B 35/086 |
| | | | 701/300 |
| 2013/0056581 | A1 | 3/2013 | Sparks |
| 2013/0238168 | A1 | 9/2013 | Reyes |
| 2014/0254896 | A1 | 9/2014 | Zhou et al. |
| 2015/0022432 | A1 | 1/2015 | Stewart et al. |
| 2015/0070272 | A1 | 3/2015 | Kim et al. |
| 2015/0175263 | A1 | 6/2015 | Reyes |
| 2015/0199022 | A1 | 7/2015 | Gottesman et al. |
| 2015/0287246 | A1 | 10/2015 | Huston et al. |
| 2015/0331490 | A1 | 11/2015 | Yamada |
| 2015/0362917 | A1 | 12/2015 | Wang et al. |
| 2016/0062364 | A1* | 3/2016 | Foinet .................... A63H 27/12 |
| | | | 701/2 |
| 2016/0063987 | A1 | 3/2016 | Xu et al. |
| 2016/0101856 | A1* | 4/2016 | Kohstall ............... B64C 39/024 |
| | | | 244/17.23 |
| 2016/0161946 | A1 | 6/2016 | Wuth Sepulveda et al. |
| 2016/0179096 | A1 | 6/2016 | Bradlow et al. |
| 2016/0292886 | A1 | 10/2016 | Erad et al. |
| 2016/0307573 | A1 | 10/2016 | Wobrock |
| 2016/0313742 | A1* | 10/2016 | Wang ..................... G05D 1/0676 |
| 2016/0336020 | A1 | 11/2016 | Bradlow et al. |
| 2017/0023947 | A1* | 1/2017 | McMillion ............. B64U 80/25 |
| 2017/0031369 | A1 | 2/2017 | Liu et al. |
| 2017/0045891 | A1* | 2/2017 | Wang ..................... B64C 39/024 |
| 2017/0094259 | A1 | 3/2017 | Kouperman et al. |
| 2017/0099424 | A1 | 4/2017 | Jones |
| 2017/0102699 | A1 | 4/2017 | Anderson |
| 2017/0176992 | A1* | 6/2017 | Wang ..................... B64U 70/10 |
| 2017/0177925 | A1 | 6/2017 | Volkart |
| 2017/0193308 | A1* | 7/2017 | Buyse ................. G08B 21/0446 |
| 2017/0197731 | A1* | 7/2017 | Yang ..................... B64C 39/024 |
| 2017/0225796 | A1 | 8/2017 | Sun et al. |
| 2017/0228690 | A1 | 8/2017 | Kohli |
| 2017/0244937 | A1 | 8/2017 | Meier et al. |
| 2017/0320564 | A1 | 11/2017 | Kuzikov |
| 2017/0337791 | A1 | 11/2017 | Gordon-carroll |
| 2017/0371353 | A1 | 12/2017 | Millinger, III |
| 2018/0065759 | A1* | 3/2018 | Michalski .............. G08G 5/025 |
| 2018/0082682 | A1 | 3/2018 | Erickson et al. |
| 2018/0129212 | A1* | 5/2018 | Lee ........................ G05D 1/0094 |
| 2018/0246529 | A1 | 8/2018 | Hu et al. |
| 2018/0321676 | A1* | 11/2018 | Matuszeski .......... G05D 1/0055 |
| 2019/0011921 | A1 | 1/2019 | Wang et al. |
| 2019/0384298 | A1* | 12/2019 | Liu ........................ B64C 39/024 |
| 2020/0035030 | A1* | 1/2020 | Schradin ................. G06T 17/05 |
| 2020/0097027 | A1* | 3/2020 | Su ......................... G05D 1/0808 |
| 2020/0134212 | A1* | 4/2020 | Hutchison ............. H04L 9/0833 |
| 2020/0241575 | A1 | 7/2020 | Meisenholder et al. |
| 2021/0018935 | A1* | 1/2021 | Huang ................... B64C 39/024 |
| 2021/0362848 | A1 | 11/2021 | Spencer |
| 2021/0382503 | A1 | 12/2021 | Meisenholder et al. |

OTHER PUBLICATIONS

"U.S. Appl. No. 16/294,597, Final Office Action mailed Jan. 20, 2023".

"U.S. Appl. No. 16/294,597, Non Final Office Action mailed Aug. 18, 2022", 15 pgs.

"U.S. Appl. No. 16/294,597, Notice of Allowance mailed May 15, 2023".

"U.S. Appl. No. 16/294,597, Response filed Apr. 20, 2023 to Final Office Action mailed Jan. 20, 2023", 9 pgs.

"U.S. Appl. No. 16/294,597, Response filed Nov. 1, 2022 to Non Final Office Action mailed Aug. 18, 2022", 13 pgs.

Laput, Gierad, et al., "PixelTone: A Multimodal Interface for Image Editing", ACM, Proceedings of the SIGCHI Conference on Human Factors in Computing Systems, Paris, FR, (2013), 10 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Meisenholder, David, et al., "Remoteless Control of Drone Behavior", U.S. Appl. No. 15/640,143, filed Jun. 30, 2017, 108 pgs.

Pourmehr, Shokoofeh, et al., "'You two! Take off!': Creating, Modifying, and Commanding Groups of Robots Using Face Engage-

(56) References Cited

OTHER PUBLICATIONS ment and Indirect Speech in Voice Commands", IEEE/RSJ International Conference on Intelligent Robots and Systems (IROS), Tokyo, JP, (2013), 137-142.

Yamada, Wataru, et al., "iSphere: Self-Luminous Spherical Drone Display", Proceedings of the 30th Annual ACM Symposium on User Interface Software and Technology (UIST), Quebec City, CA, (Oct. 22-25, 2017), 635-343.

* cited by examiner

SYSTEMS AND METHODS FOR ESTIMATING USER INTENT TO LAUNCH AUTONOMOUS AERIAL VEHICLE

CROSS REFERENCE TO RELATED APPLICATIONS

This application is a continuation of U.S. application Ser. No. 16/294,597, filed Mar. 6, 2019 and entitled, "Reliable Drone Launching," which claims priority to U.S. Provisional Application No. 62/639,280, filed Mar. 6, 2018 and entitled "Systems, Devices, and Methods for Reliable Launching." The contents of these prior applications are considered part of this application, and are hereby incorporated by reference in their entireties.

TECHNICAL FIELD

The present disclosure generally relates to the technical field of autonomous vehicles. In particular, methods, systems, and devices for reliably launching an autonomous vehicle are disclosed.

BACKGROUND

Social networks are beginning to link with autonomous vehicles to provide enhanced experiences for their users. Autonomous vehicles may provide additional perspectives when capturing images, video and/or audio for example. To increase adoption of the use of autonomous vehicles as part of a robust social network experience, the autonomous vehicles should be easy for users to use and integrate into their daily lives. Therefore, improved methods, devices and systems for the use of autonomous vehicles in conjunction with social networks are desired.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Disclosed are methods, systems, and devices to improve the reliability of launching an autonomous vehicle. In some aspects, the autonomous vehicle may be in communication with a social network. For example, the autonomous vehicle may be equipped with a camera, and be configured to capture images or videos from an aerial perspective. After images are captured by the autonomous vehicle, they may be uploaded to a user's social network account, enabling the user to edit and/or share these images via the social network.

In some aspects, the autonomous vehicle may be launched by being thrown by the social network user. Upon detecting that it has been thrown, the autonomous vehicle may initiate flight operations, such as by energizing one or more motors integrated with the autonomous vehicle. In some cases, upon detection of the launch, the autonomous vehicle may also initiate a flight control program that provides for autonomous vehicle functions, such as one or more of flight stabilization, attitude and/or altitude control, obstacle avoidance, tracking of the user, and other functions.

The disclosed methods, systems, and devices may rely on data from an accelerometer and a touch sensor when determining whether the vehicle has been launched. For example, in some aspects, input received from the accelerometer must match specific criteria, and input received from one or more touch sensors on the autonomous vehicle must match specific second criteria before a launch can be detected. By relying on input from both an accelerometer and the one or more touch sensors, the reliability of launch detection may be improved. This may, for example, prevent energizing of an autonomous vehicle motor when the autonomous vehicle has not been launched, therefore improving safety.

Figure 1A:
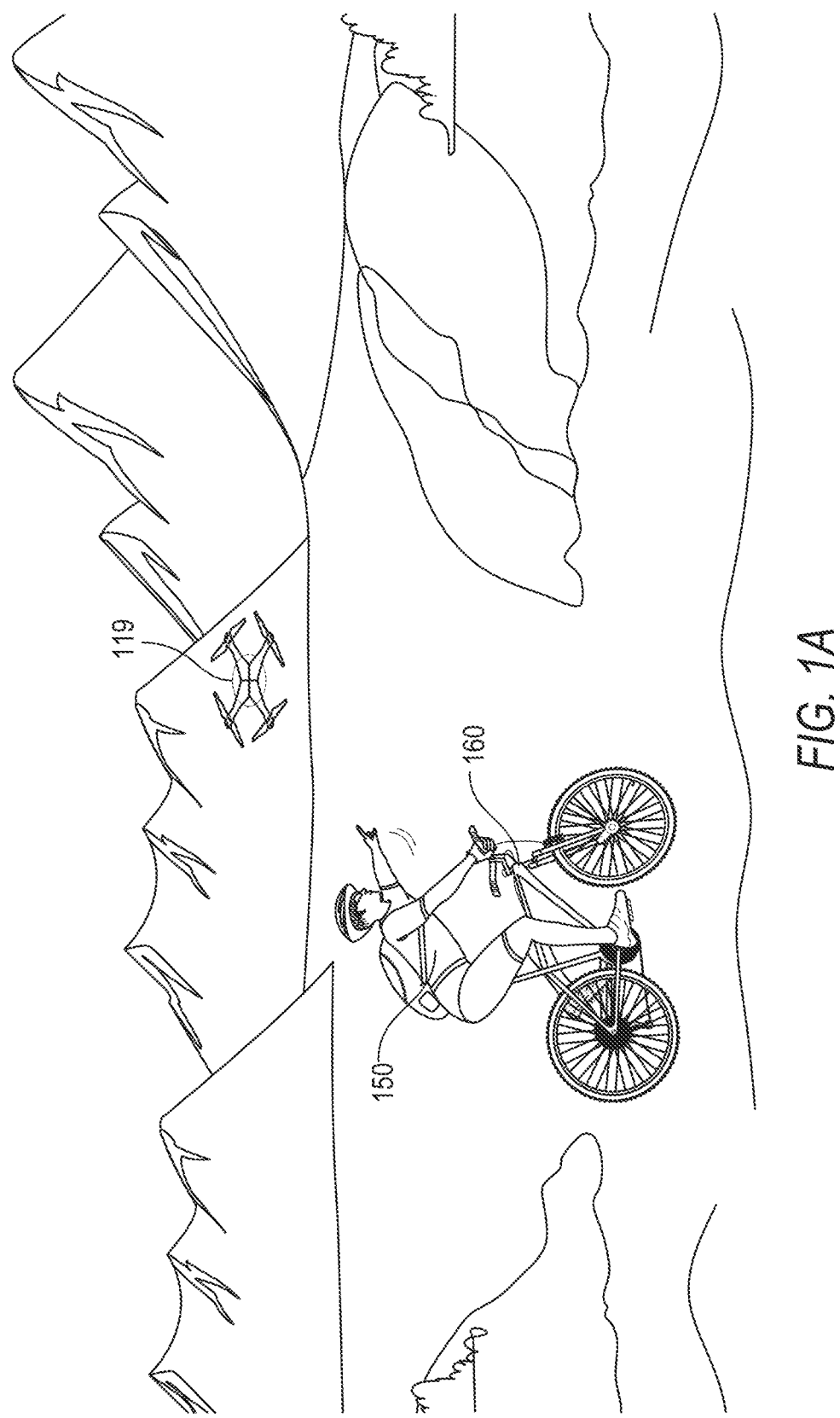
FIG. 1A is an overview diagram showing one example of launching an autonomous vehicle.

FIG. 1A is an overview diagram showing a social network user 150 riding a bike 160. The user has just launched an autonomous vehicle 119 by throwing it. As discussed above, the autonomous vehicle 119 may detect the launch via a combination of inputs from an accelerometer and one or more touch sensors.

Figure 1B:
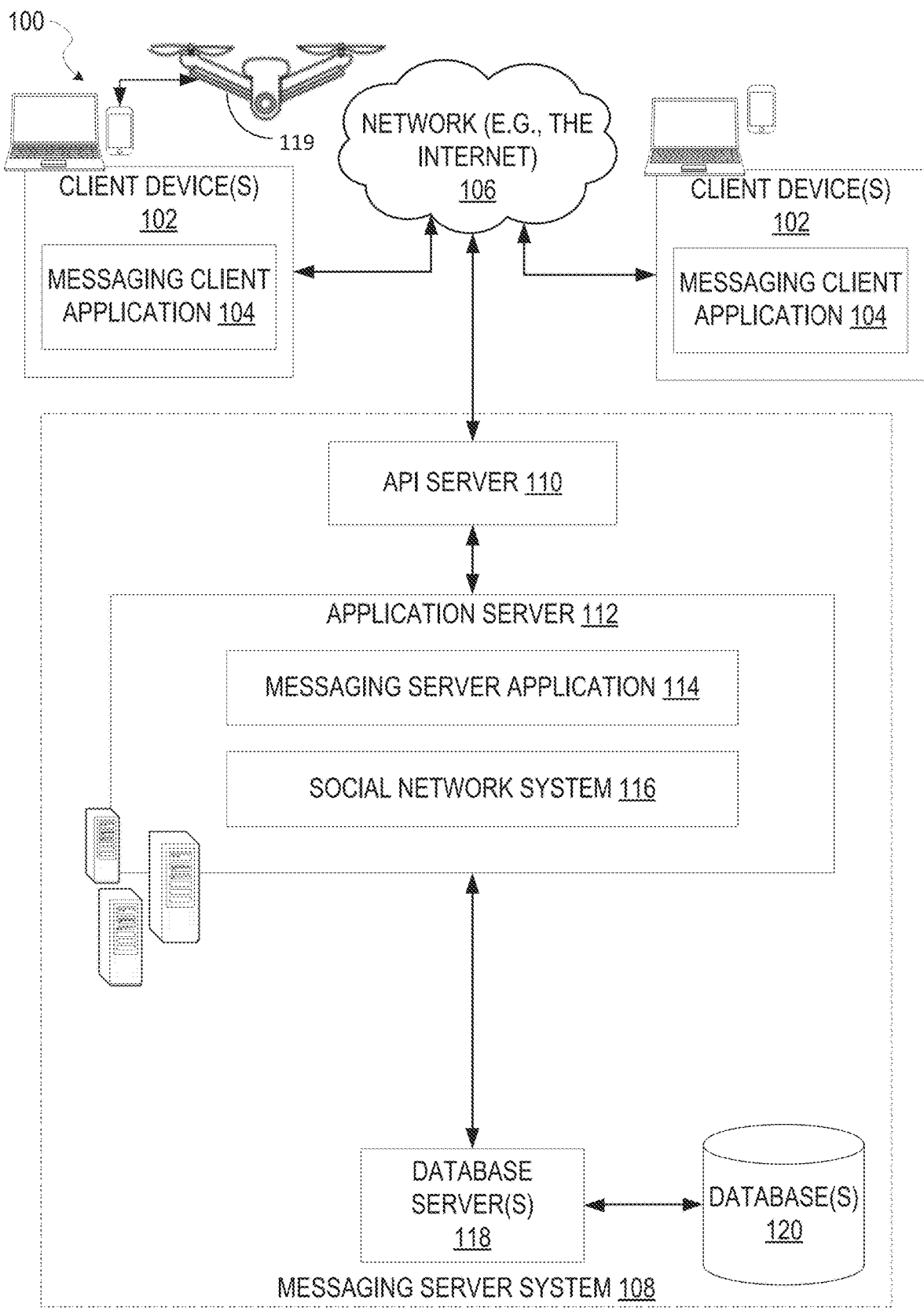
FIG. 1B is an exemplary block diagram of a messaging system for exchanging data (e.g., messages and associated content) over a network.

FIG. 1B is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces with a communications network (such as the network 106) to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronics system, game console, set-top box, or any other communication device that a user may use to access a network.

In the example shown in FIG. 1B, each messaging client application 104 is able to communicate and exchange data with another messaging client application 104 and with the messaging server system 108 via the network 106. The data exchanged between the messaging client applications 104, and between a messaging client application 104 and the messaging server system 108, includes functions (e.g., commands to invoke functions) as well as payload data (e.g., text, audio, video, or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 106 or a portion of the network 106 may include a wireless or cellular network and the connection to the network 106 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third-Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long-Term Evolution (LTE) standard, or others defined by various standard-setting organizations, other long-range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Programming Interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the application server 112, for possible access by another messaging client application 104; the setting of a collection of media data (e.g., story); the retrieval of a list of friends of a user of a client device 102; the retrieval of such collections; the retrieval of messages and content; the adding and deletion of friends to and from a social graph; the location of friends within a social graph; and the detecting of an application event (e.g., relating to the messaging client application 104).

The application server 112 hosts a number of applications and subsystems, including a messaging server application 114 and a social network system 116. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The social network system 116 supports various social networking functions and services, and makes these functions and services available to the messaging server application 114. To this end, the social network system 116 maintains and accesses an entity graph within the database 120. Examples of functions and services supported by the social network system 116 include the identification of other users of the messaging system 100 with whom a particular user has relationships or whom the user is "following," and also the identification of other entities and interests of a particular user.

The disclosed methods and systems may provide for improved launch of an autonomous vehicle that may be in communication with the client device 102 and, in some aspects, with the social network system 116.

FIG. 1B also illustrates the autonomous vehicle 119, which may be in communication with a client device 102. The autonomous vehicle 119 may include one or more motors. In some aspects, such as the aerial drone embodiment of the autonomous vehicle 119 shown in FIG. 1A, the one or more motors may be configured to lift the autonomous vehicle 119 off the ground and allow the autonomous vehicle 119 to traverse laterally over the ground. The autonomous vehicle 119 may also be configured to vary its altitude above the ground by modulating a power level provided to the one or more motors.

Methods, devices, and systems disclosed herein may provide the autonomous vehicle 119 with a more reliable method of air launching when compared to other methods. For example, in some aspects, the autonomous vehicle 119 may utilize a combination of sensors when determining whether the autonomous vehicle 119 has been air launched. For example, accelerations provided by an accelerometer within the autonomous vehicle 119 may be examined to identify certain signature accelerations typical of an air launch. If the accelerations match those signatures, then input from other sensors, for example touch sensors located on the drone, may be examined to determine if any touch is detected. If no touch is detected, and the accelerations measured by the autonomous vehicle 119 match acceleration signatures typically experienced during an air launch operation, then the autonomous vehicle 119 may power up its one or more motors and transition into a flight control program.

Figure 2:
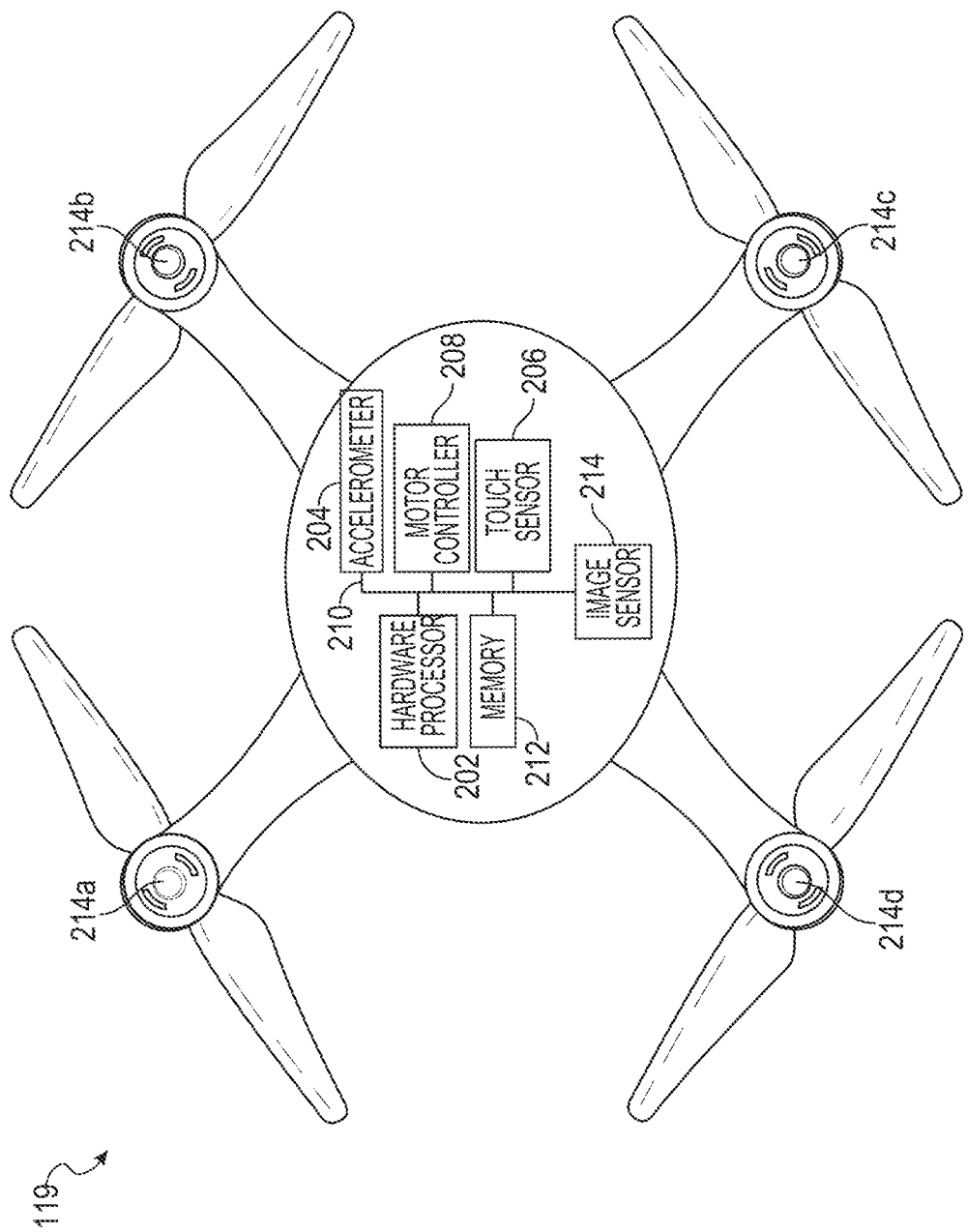
FIG. 2 is block diagram illustrating further details regarding the messaging system, according to some embodiments.

FIG. 2 is a detailed diagram of the autonomous vehicle 119. The autonomous vehicle 119 is shown to include a hardware processor 202, accelerometer 204, motor controller 208, and a touch sensor 206. In some aspects, the autonomous vehicle 119 may also include an electronic hardware memory 212. In some aspects, the autonomous vehicle 119 may include an image sensor 214. The hardware processor 202 may be operably coupled to one or more of the accelerometer 204, motor controller 208, touch sensor 206, and the memory 212 via any known interconnect technology, such as a bus 210. In some aspects, the memory 212 may be integrated with the hardware processor 202. In some aspects, the memory stores instructions that configure the hardware processor to perform one or more of the functions discussed below, for example, with respect to FIG. 4. While processor 202 is shown in FIG. 2 as one physical processor, in some aspects, the processor 202 may be multiple physical hardware processors.

FIG. 2 also shows an embodiment of the autonomous vehicle 119 that includes four motors 214a-d. In various embodiments, the autonomous vehicle 119 may include one or more motors. The one or more motors 214a-d may be operably connected to the motor controller 208, allowing the motor controller 208 to control a speed of rotation of each of the one or more motors 214a-d. In some aspects of the autonomous vehicle 119, one or more of the motors 214a-d may be operably connected directly to the hardware processor 202, and there may be no motor controller 208 in these embodiments.

In some aspects, the hardware processor 202 may control the image sensor 214. For example, the hardware processor 202 may capture snapshot images and/or videos using the image sensor 214. In some aspects, the autonomous vehicle 119 may also include a microphone (not shown). The microphone may be utilized to capture audio data to accompany video data captured by the image sensor 214 in some aspects. While the hardware processor 202 is shown in FIG. 2 as a singe component, one of skill in the art would understand that the hardware processor 202 may be comprised of one or more physically separate hardware processors, which may work in conjunction to accomplish the disclosed embodiments.

Figure 3:
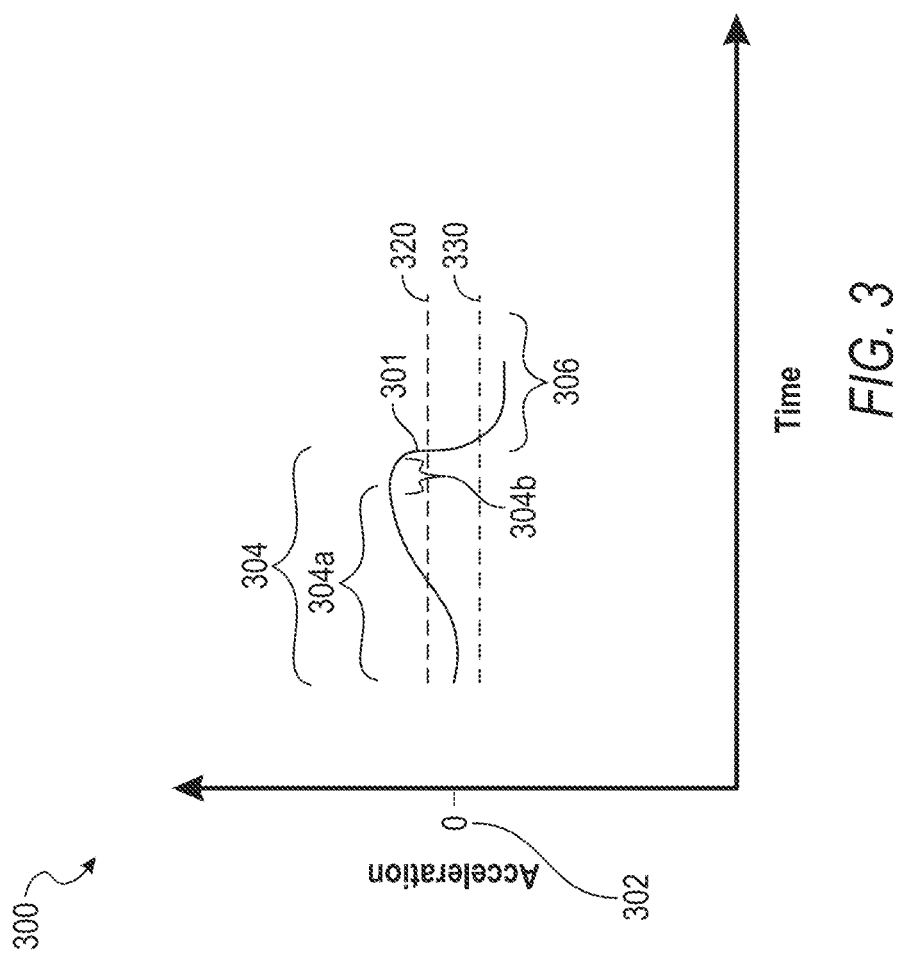
FIG. 3 is a graph showing accelerations that may be indicative of an air launch in some embodiments.

FIG. 3 is a graph of accelerations experienced by at least one embodiment of the autonomous vehicle 119. The graph 300 illustrates positive accelerations above a zero value 302 and negative accelerations below the zero value 302 over time. The accelerations shown in the graph 300 are with respect to a particular axis is a three dimensional space, such as a Z axis. The Z axis may be aligned with a gravitational force, with positive accelerations against the gravitational force and negative accelerations consistent with the gravitational force. For example, in some aspects, a positive acceleration shown in graph 300 may be in what is generally understood to be an "up" direction, or away from a center of the earth. A negative acceleration shown in graph 300 may be in what is generally understood as a "down" direction, or towards the center of the earth. The accelerations shown in the graph 300 include at least two regions, identified as 304 and 306. The accelerations within the region 304 are positive accelerations of varying force. In some aspects, accelerations within the region 304 may be indicative of accelerations experienced when a user throws the autonomous vehicle 119. For example, the accelerations may include a build-up period, 304a, and a release period, shown as sub-region 304b. The build-up period 304a may result from the user accelerating the autonomous vehicle 119 during a power portion of the user's throwing motion. The release period 304b may result from the user reaching an end of their throwing motion, with accelerations reduce rapidly.

The accelerations in the region 304 may be positive and at least a portion of the accelerations in the region 304 may be above a first threshold 320 in some aspects. In some embodiments not shown in FIG. 3, the threshold 320 may be equivalent to zero 302. In other aspects, such as the embodiment shown, the threshold 320 may be a positive threshold value (above zero) as shown in FIG. 3.

Accelerations within the region 306 are negative accelerations. In some aspects, the accelerations present in the region 306 may be indicative of a free-fall event. In some aspects, at least a portion of the accelerations in the region 306 may be below a second threshold value 330. In some aspects, other than that illustrated in FIG. 3, the second threshold 330 value may be equivalent to zero value 302. In other aspects, the second threshold 330 value may be below zero (e.g. negative). In some aspects, the second threshold 330 may be an acceleration approximately equivalent to an acceleration of gravity, which in some aspects, is 9.8 m/sec². Thus, the second threshold may be −9.8 m/sec² in some aspects.

Figure 4:
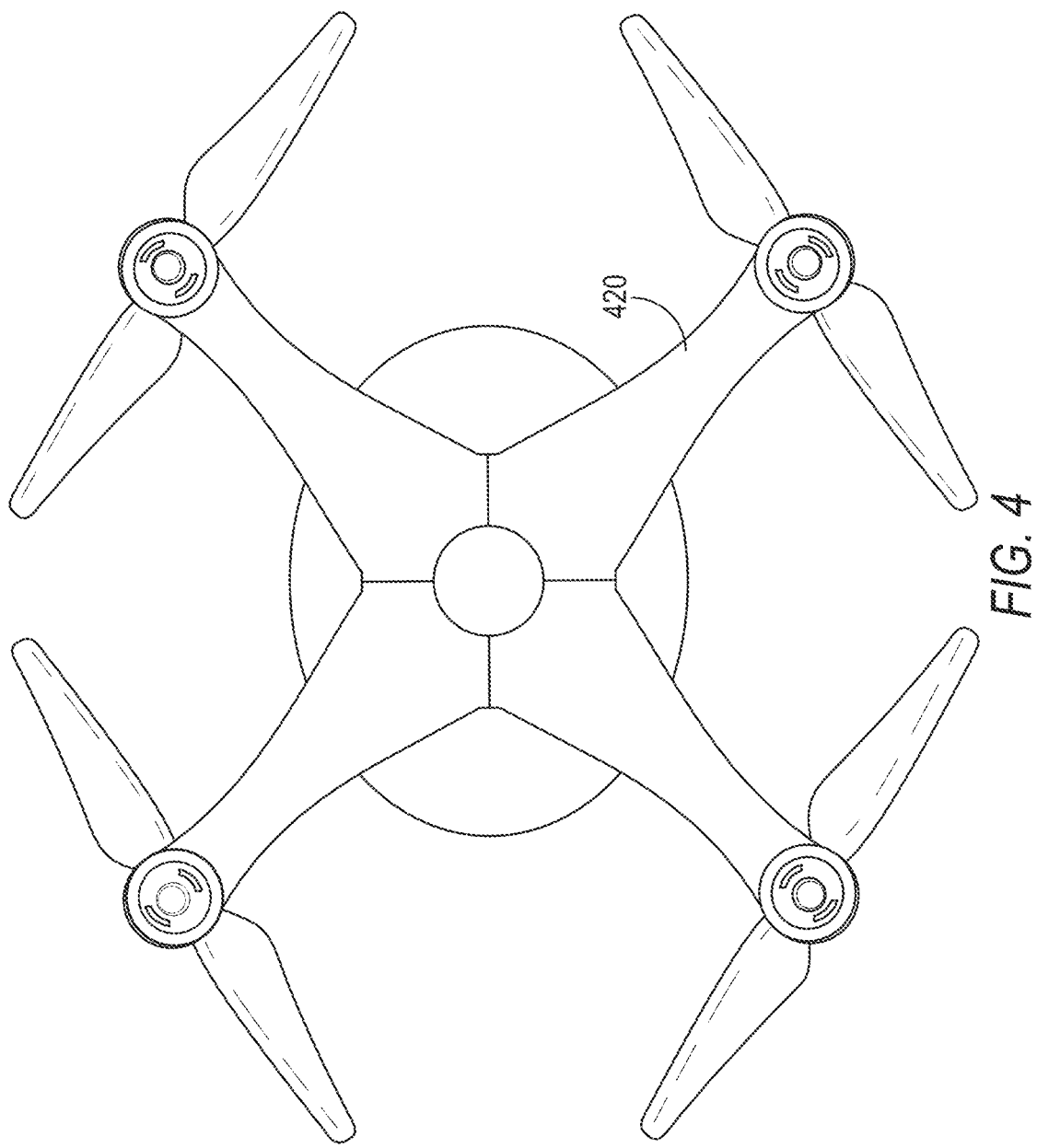
FIG. 4 shows an autonomous vehicle according to some embodiments.

FIG. 4 shows a planform view of one embodiment of an autonomous vehicle 119. The autonomous vehicle 119 includes a case, shell, or body 420. The case, shell, or body may substantially surround internal components of the autonomous vehicle 119, such as one or more of the components illustrated in FIG. 2. The case, shell or body may be comprised of aluminum, steel, or other metal in some aspects. This metal may have conductive properties. As such, touching the shell, case, or body may vary one or more electrical characteristics of the shell, such as a conductance, capacitance, or other electrical characteristics. This variation in the electrical characteristics of the shell may provide for detection of a touch of the autonomous vehicle 119. For example, the shell may have a first electrical characteristic when there is no touch present on the shell, and a second electrical characteristic when a touch is present on the shell. This difference may be used to detect a touch of the autonomous vehicle in some aspects. For example, the hardware processor 202 may periodically measure the electronic characteristic of the shell, via for example, the touch sensor 206 in some aspects. Changes in the measurements may be used to detect a touch of the shell. In some aspects, absolute values of the measurements may be used to detect a touch condition or a no touch condition. For example, in some aspects, constants may be hard coded or otherwise stored into the memory 212 in some aspects, indicating approximate values of the electronic characteristics in a no touch and/or a touch condition. In some aspects, the processor 202 may compare the measured electrical characteristics of the shell 420 to the constants stored in the memory 212 to determine whether a touch condition is present or a touch condition is not present.

Figure 5:
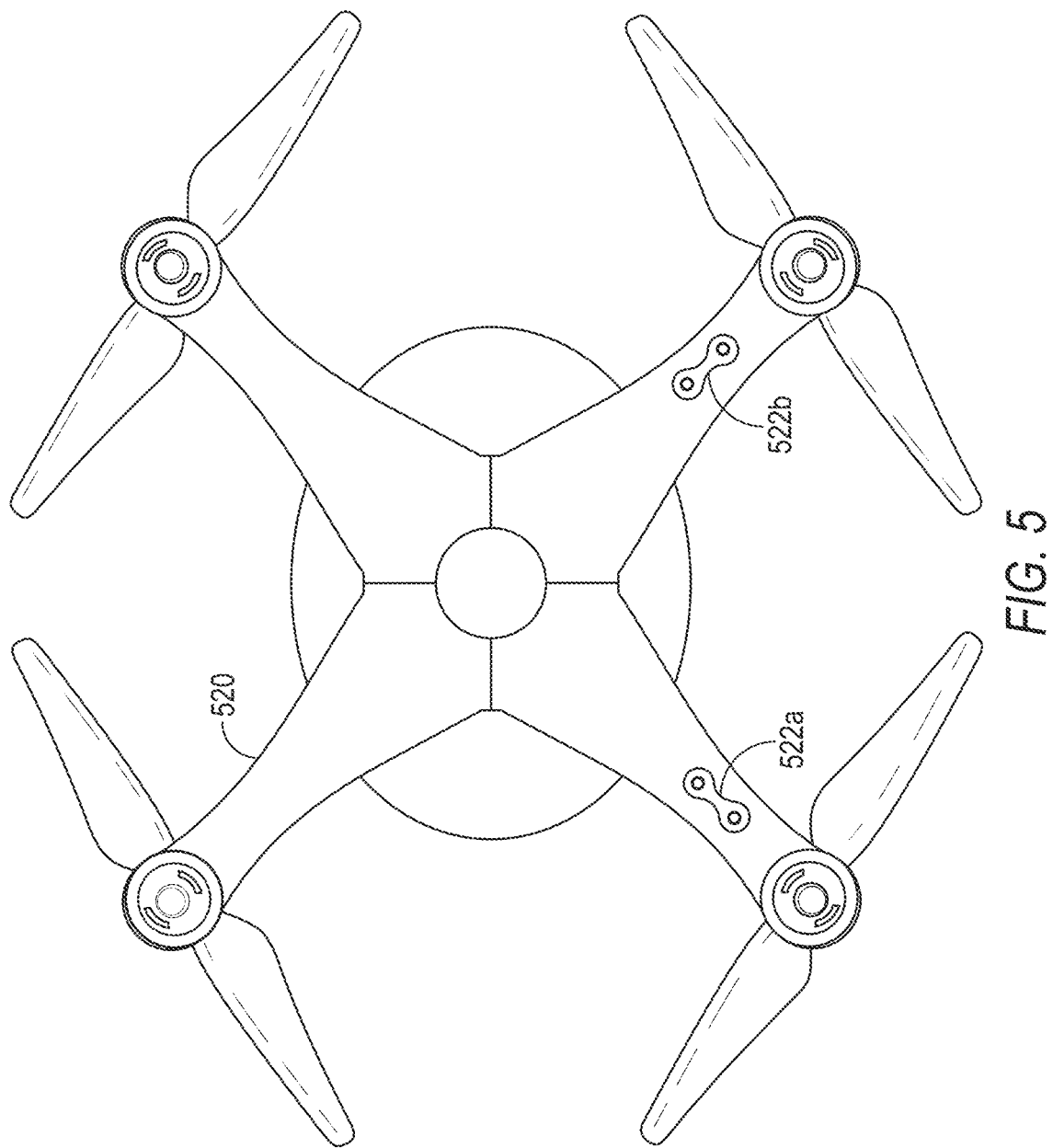
FIG. 5 shows an autonomous vehicle according to some embodiments.

FIG. 5 shows another embodiment of the autonomous vehicle 119. The embodiment of the autonomous vehicle 119 includes touch sensors 522a-b. The touch sensors 522a-b may be equivalent to the touch sensor 206 discussed above with respect to FIG. 2 in some aspects. In some aspects, the touch sensors 522a-b may physically deform in some manner when touched. For example, in some aspects, the touch sensors 522a-b may include buttons that are pressed when the autonomous vehicle 119 is held at a point covered by one of the touch sensors 522a-b. Alternatively, the touch sensors may have a surface that has electrical properties, which change when any one or more of touch sensors 522a-b is touched. Thus, a touch may be detected by a change in one or more of the electrical properties of the touch sensors 522a-b in some aspects. While FIG. 5 shows only two touch sensors 522a-b covering a small portion of a shell 520 of the autonomous vehicle 119, in some aspects, a larger portion of a surface of the shell 520 of the autonomous vehicle 119 may be covered by touch sensors. For example, embodiments including 2, 3, 4, 5, 6, 7, 8, 9, 10, 11, 12, 13, 14, 15, 16, 17, 18, 19, 20, or any number of touch sensors are contemplated. In addition, a surface area of each touch sensor relative to a surface area of the autonomous vehicle 119 is not limited to that shown in FIG. 5. For example, touch sensors with areas larger or smaller relative to a surface area of the autonomous vehicle 119 shown in FIG. 5 are contemplated.

Figure 6:
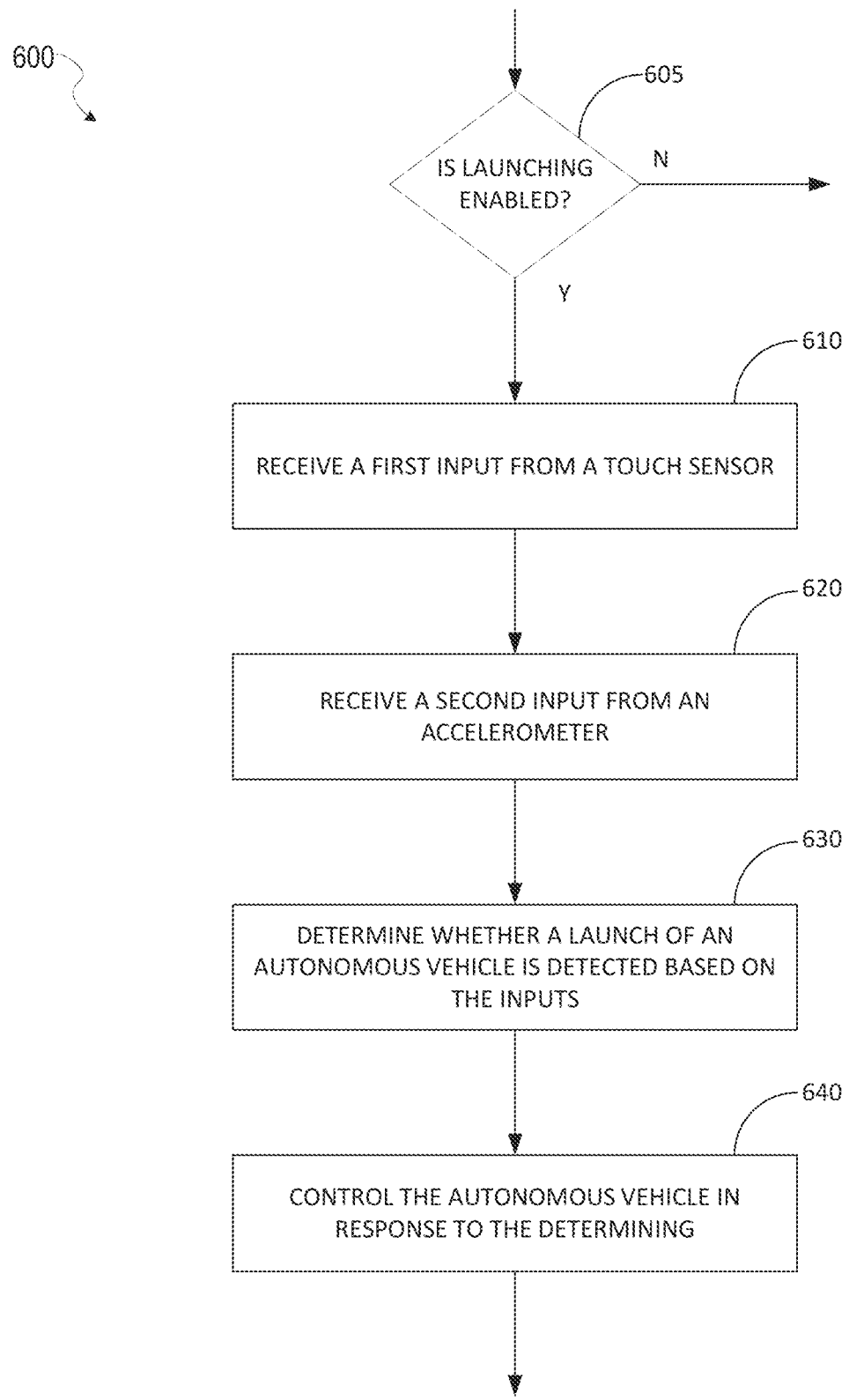
FIG. 6 is a flowchart of a method of controlling an autonomous vehicle.

FIG. 6 is a flowchart of a method of detecting a launch event of an autonomous vehicle. In some aspects, the autonomous vehicle may be the autonomous vehicle 119, discussed above with respect to FIGS. 1-3. In some aspects, one or more of the functions of process 600 discussed below with respect to FIG. 6 may be performed by the hardware processor 202, discussed above with respect to FIG. 2. For example, in some aspects, instructions stored in the memory 212 may configure the hardware processor 202 to perform one or more of the functions discussed below.

Decision operation 605 determines whether launching of the vehicle is enabled. Enabling of a launch of the vehicle may consider one or more conditions. In some aspects, an autonomous vehicle may include an enabling switch, the switch having at least two distinct positions. In some embodiments, the switch must be set to a first or "on" or "active" position for the vehicle to be considered launch enabled. A second switch position such as an "off" or "disarmed" position may prevent operation 605 from determining that launch is enabled.

In some aspects, gestures may be utilized to enable launch of the vehicle. For example, in some aspects, the image sensor 214 may capture images which are analyzed by the processor 202. A predetermined gesture identified by the processor 202 may indicate the vehicle is to be enabled for launch. In some aspects, a rotation gesture may serve this purpose. In some aspects, inputs from an accelerometer may be analyzed to determine if the vehicle is enabled for launch. For example, in some aspects, rotating the vehicle 360 degrees about an axis, such as 1, 2, 3, 4, 5, 6, or any predetermined number of times may be considered a launch enabling signal. In some aspects, the rotations must be detected within a predetermined elapsed time period. For example, a number of rotations detected within, for example, no more than three seconds per rotation must be detected in some aspects. For example, two rotations must be detected within six seconds in some embodiments. In other embodiments, three rotations within nine seconds must be detected. Other numbers of rotations, rate of rotations, and/or total elapsed time for the rotations to be detected are contemplated.

Upon detecting a predetermined number of vehicle rotations about an axis, the processor 202 may enable the vehicle 119 for launch in some aspects. In some aspects, two or more of the methods discussed above may be required to enable the vehicle 119 for launch. In these embodiments, each of the selected launch enabling conditions must be satisfied to enable launch of the vehicle.

In some aspects, a period of inactivity, where no launch enabling inputs are received, may disable the vehicle for launch. In other aspects, the vehicle may be disabled for launch via the switch discussed above, or by recognition of a disarming gesture, or a disarming movement of the vehicle that is recognized based on input from the accelerometer. In some aspects, when the vehicle is enabled for launch, an indicator light may illuminate or flash. In some aspects, the vehicle may include a speaker, and may emit an audible sound when enabled for launch and/or disabled for launch.

In operation 610, a first input is received from a touch sensor. For example, in some aspects, the hardware processor 202 may read data from the touch sensor 206 over the bus 210. In some aspects, the input may indicate whether a touch is detected or if no touch is detected. For example, as discussed above, in some aspects, the autonomous vehicle 119 may include paint with varying electrical characteristics depending on whether the paint is being touched or not. In some other aspects, the autonomous vehicle 119 may include a shell or body portion that may be made of a metal material, such as aluminum. In these aspects, the material of the shell may exhibit an electrical characteristic that varies based on whether the shell is being touched or not. In these aspects, the touch sensor may be the paint or the aluminum shell. In other aspects, a touch sensor may be positioned on the shell or body portion of the autonomous vehicle. The touch sensor may have a deformable portion. When a shape of the deformable portion varies due to touch, this may change an electrical characteristic of the touch sensor.

In operation 620, a second input is received from an accelerometer. In some aspects, the input may define one or more accelerations over time experienced by an autonomous vehicle, such as the autonomous vehicle 119. In some aspects, the accelerations may include one or more of positive accelerations and negative accelerations, with positive accelerations being in a direction opposite to a gravitational force and negative accelerations being in a direction consistent to or aligned with the gravitational force.

Operation 630 determines whether a launch of the autonomous vehicle is detected based on the inputs. In some aspects, a launch detection may require that the acceleration received in operation 620 meet an acceleration criteria, and the input from the touch sensor of operation 610 meet a touch input criteria. If both criteria are met, then a launch may be detected in some aspects. As discussed above with respect to FIG. 4 and FIG. 5, in some aspects, touch inputs may be generated by a skin sensor of the drone or by touch sensors that physically deform to detect a touch (e.g. from touch sensors 522a-b or via the skin of drone 420). In some aspects, if one or more touch inputs indicate the vehicle is being touched, a launch detection may be inhibited. If no touch inputs indicate the vehicle is being touched, a detection of a launch, in combination with inputs from the acceleration sensor, may be possible in some aspects.

In some aspects, the acceleration criteria may include a first period of acceleration in a positive direction, with the positive acceleration period including some acceleration measurements above a first threshold such as the threshold 320 shown in FIG. 3. The acceleration criteria may also include, in some aspects, a second period of acceleration in a negative direction. The second period of acceleration may be indicative of a free fall of the autonomous vehicle in some aspects. In some aspects, the second period may include one or more acceleration measurements indicating acceleration is below a negative acceleration threshold, such as the threshold 330 shown in FIG. 3.

In some aspects, detecting an launch event may be dependent on whether the autonomous vehicle was "armed" for a launch. For example, if the vehicle is not "armed," in some aspects, a launch cannot be detected. In some aspects, decision operation 605, which describes above being "enabled" for launch, is synonymous with the vehicle being "armed" for launch.

Operation 640 controls the autonomous vehicle in response to the determining. For example, in some aspects, if a launch is detected in operation 630, operation 640 may energize one or more motors of the autonomous vehicle, such as any of the motors 214a-d shown in FIG. 2. For example, in some aspects, the hardware processor 202 may transmit a command, via the bus 210, to the motor controller 208 indicating that the motor controller 208 is to energize a motor of the autonomous vehicle, such as any of the motors 214a-d. In some aspects, controlling the autonomous vehicle may also include activating or otherwise executing a program to control the autonomous vehicle in flight. In some aspects, this program may be stored in the memory 212 discussed above with respect to FIG. 2. The program may include features such as vehicle stabilization, altitude and/or attitude control, obstacle avoidance, object tracking and/or following, and/or image capturing functions such as focal control of a lens of an imaging sensor (e.g. 214) that may be included in the autonomous vehicle 119.

Software Architecture

Figure 7:
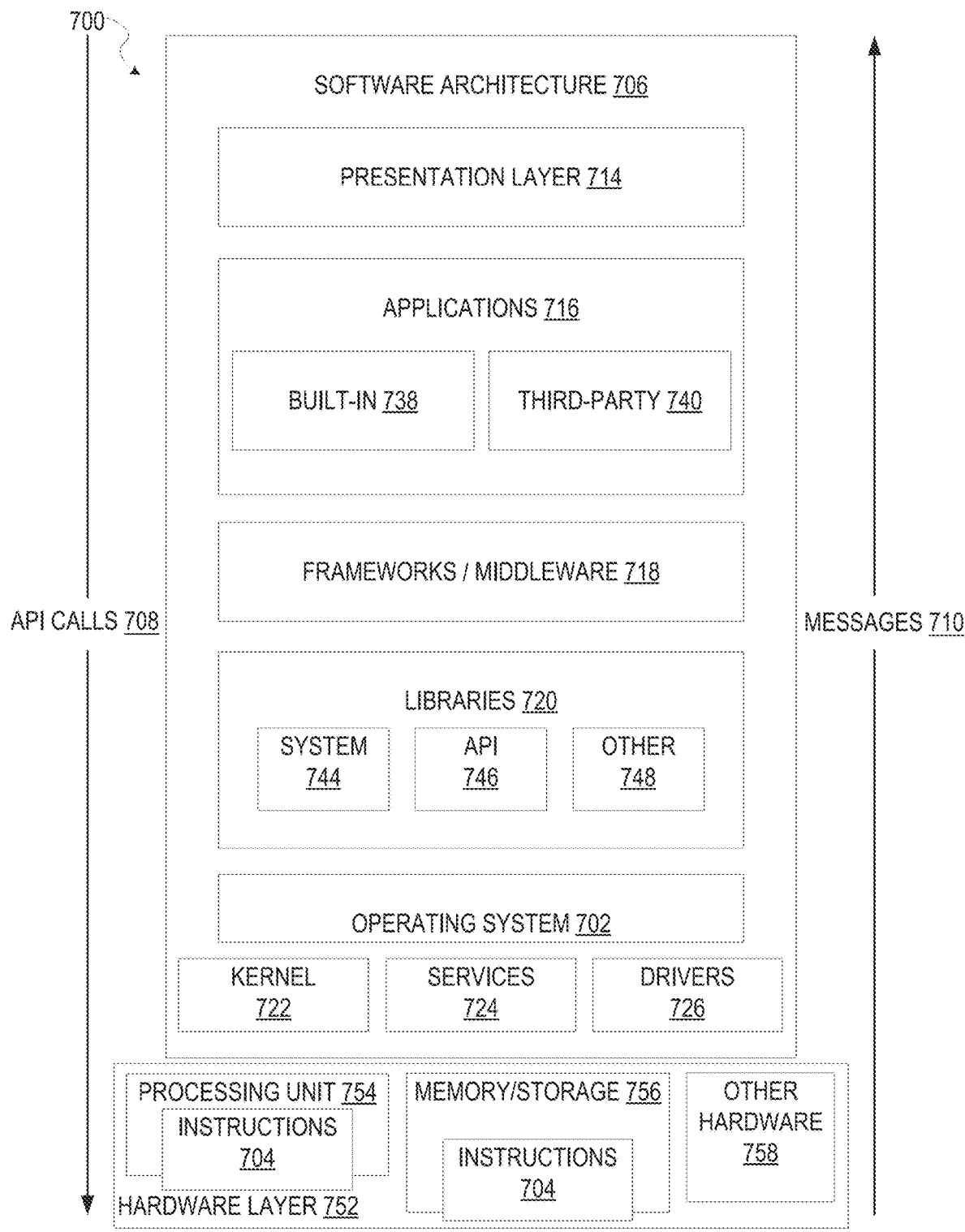
FIG. 7 is a block diagram illustrating an example software architecture

FIG. 7 is a block diagram illustrating an example software architecture 706, which may be used in conjunction with various hardware architectures herein described. FIG. 7 is a non-limiting example of a software architecture and it will be appreciated that many other architectures may be implemented to facilitate the functionality described herein. The software architecture 706 may execute on hardware such as a machine 800 of FIG. 8 that includes, among other things, processors 704, memory/storage 706, and I/O components 718. A representative hardware layer 752 is illustrated and can represent, for example, the machine 800 of FIG. 8. The representative hardware layer 752 includes a processing unit 754 having associated executable instructions 704. The executable instructions 704 represent the executable instructions of the software architecture 706, including implementation of the methods, components, and so forth described herein. The hardware layer 752 also includes memory and/or storage 756, which also have the executable instructions 704. The hardware layer 752 may also comprise other hardware 1258.

As used herein, the term "component" may refer to a device, a physical entity, or logic having boundaries defined by function or subroutine calls, branch points, APIs, and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or include, any circuit or virtual circuit (a physical circuit emulated by logic executing on an actual processor) that manipulates data values according to control signals (e.g., "commands," "op codes," "machine code," etc.) and that produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 7, the software architecture 706 may be conceptualized as a stack of layers where each layer provides particular functionality. For example, the software architecture 706 may include layers such as an operating system 702, libraries 720, frameworks/middleware 718, applications 716, and a presentation layer 714. Operationally, the applications 716 and/or other components within the layers may invoke API calls 708 through the software stack and receive a response as messages 710. The layers illustrated are representative in nature and not all software architectures have all layers. For example, some mobile or special-purpose operating systems may not provide a frameworks/middleware 718 layer, while others may provide such a layer. Other software architectures may include additional or different layers.

The operating system 702 may manage hardware resources and provide common services. The operating system 702 may include, for example, a kernel 722, services 724, and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 720 provide a common infrastructure that is used by the applications 716 and/or other components and/or layers. The libraries 720 provide functionality that allows other software components to perform tasks in an easier fashion than by interfacing directly with the underlying operating system 702 functionality (e.g., kernel 722, services 724, and/or drivers 726). The libraries 720 may include system libraries 744 (e.g., C standard library) that may provide functions such as memory allocation functions, string manipulation functions, mathematical functions, and the like. In addition, the libraries 720 may include API libraries 746 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 720 may also include a wide variety of other libraries 748 to provide many other APIs to the applications 716 and other software components/modules.

The frameworks/middleware 718 provide a higher-level common infrastructure that may be used by the applications 716 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 716 and/or other software components/modules, some of which may be specific to a particular operating system 702 or platform.

The applications 716 include built-in applications 738 and/or third-party applications 740. Examples of representative built-in applications 738 may include, but are not limited to, a contacts application, a browser application, a book reader application, a location application, a media application, a messaging application, and/or a game application. The third-party applications 740 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 740 may invoke the API calls 708 provided by the mobile operating system (such as the operating system 702) to facilitate functionality described herein.

The applications 716 may use built-in operating system functions (e.g., kernel 722, services 724, and/or drivers 726), libraries 720, and frameworks/middleware 718 to create user interfaces to interact with users of the system. Alternatively, or additionally, in some systems interactions with a user may occur through a presentation layer, such as the presentation layer 714. In these systems, the application/component "logic" can be separated from the aspects of the application/component that interact with a user.

Exemplary Machine

Figure 8:
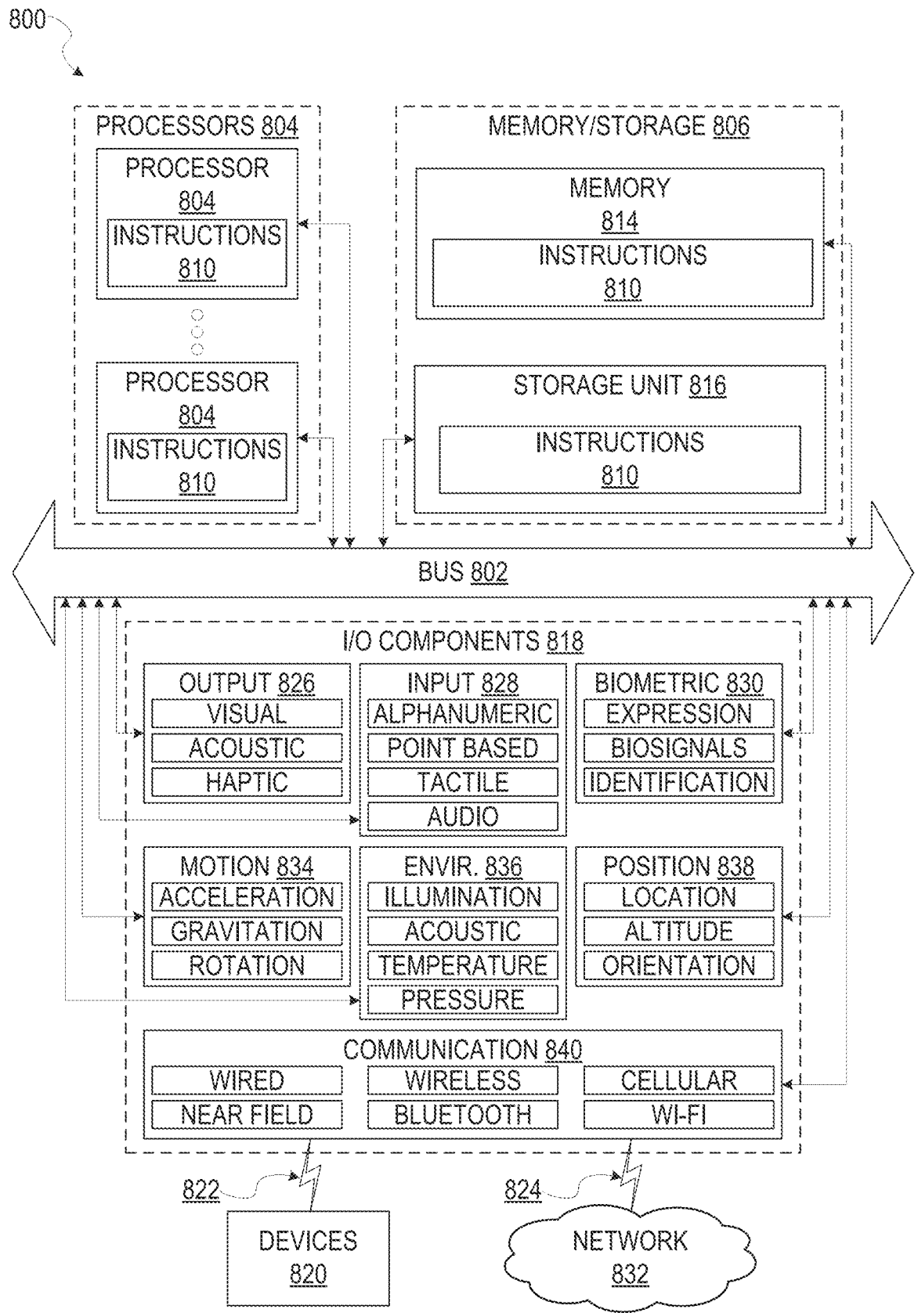
FIG. 8 is a block diagram illustrating exemplary components (also referred to herein as "modules") of a machine.

FIG. 8 is a block diagram illustrating exemplary components (also referred to herein as "modules") of a machine 800. In some aspects, the machine is configured to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform any one or more of the methodologies discussed herein may be executed. As such, the instructions 810 may be used to implement modules or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 810, sequentially or otherwise, that specify actions to be taken by machine 800. Further, while only a single machine 800 is illustrated, the term "machine" shall also be taken to include a collection of machines that individually or jointly execute the instructions 810 to perform any one or more of the methodologies discussed herein.

The machine 800 may include processors 804, memory/storage 806, and I/O components 818, which may be configured to communicate with each other such as via a bus 802. The memory/storage 806 may include a memory 814, such as a main memory, or other memory storage, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of the processors 804 are examples of machine-readable media. In some aspect, the processors 202 and processors 804 may be the same processors.

As used herein, the term "machine-readable medium," "computer-readable medium," or the like may refer to any component, device, or other tangible medium able to store instructions and data temporarily or permanently. Examples of such media may include, but are not limited to, random-access memory (RAM), read-only memory (ROM), buffer memory, flash memory, optical media, magnetic media, cache memory, other types of storage (e.g., Electrically Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes transitory signals per se.

The I/O components 818 may include a wide variety of components to provide a user interface for receiving input, providing output, producing output, transmitting information, exchanging information, capturing measurements, and so on. The specific I/O components 818 that are included in the user interface of a particular machine 800 will depend on the type of machine. For example, portable machines such as mobile phones will likely include a touch input device or other such input mechanisms, while a headless server machine will likely not include such a touch input device. It will be appreciated that the I/O components 818 may include many other components that are not shown in FIG. 8. The I/O components 818 are grouped according to functionality merely for simplifying the following discussion and the grouping is in no way limiting. In various exemplary embodiments, the I/O components 818 may include output components 826 and input components 828. The output components 826 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like. The input components 828 may also include one or more image-capturing devices, such as a digital camera for generating digital images and/or video.

In further exemplary embodiments, the I/O components 818 may include biometric components 830, motion components 834, environment components 836, or position components 838, as well as a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 834 may include acceleration sensor components (e.g., accelerometer), gravitation sensor components, rotation sensor components (e.g., gyroscope), and so forth. The environment components 836 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 838 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 818 may include communication components 840 operable to couple the machine 800 to a network 832 or devices 820 via a coupling 824 and a coupling 822 respectively. For example, the communication components 840 may include a network interface component or other suitable device to interface with the network 832. In further examples, the communication components 840 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 820 may be another machine or any of a wide variety of peripheral devices (e.g., a peripheral device coupled via a USB).

Moreover, the communication components 840 may detect identifiers or include components operable to detect identifiers. For example, the communication components 840 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4111, Ultra Code, UCC RSS-2D bar code, and other optical codes), or acoustic detection components (e.g., microphones to identify tagged audio signals). In addition, a variety of information may be derived via the communication components 840, such as location via Internet Protocol (IP) geolocation, location via Wi-Fi® signal triangulation, location via detecting an NFC beacon signal that may indicate a particular location, and so forth.

Where a phrase similar to "at least one of A, B, or C," "at least one of A, B, and C," "one or more of A, B, or C," or "one or more of A, B, and C" is used, it is intended that the phrase be interpreted to mean that A alone may be present in an embodiment, B alone may be present in an embodiment, C alone may be present in an embodiment, or any combination of the elements A, B, and C may be present in a single embodiment; for example, A and B, A and C, B and C, or A and B and C may be present.

Changes and modifications may be made to the disclosed embodiments without departing from the scope of the present disclosure. These and other changes or modifications are intended to be included within the scope of the present disclosure, as expressed in the following claims.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

We claim:

1. A method for controlling an autonomous vehicle, the method comprising:
within a predetermined amount of time after determining the autonomous vehicle has been enabled for launching:
determining that an input signal received from an accelerometer satisfies a predetermined acceleration criterion while simultaneously determining that an input signal from a deformable touch sensor satisfies a predetermined touch input criterion, the input signal from the deformable touch sensor resulting from a change in shape of the deformable touch sensor; and
in response to determining that the input signal received from the accelerometer satisfies the predetermined acceleration criterion while simultaneously determining that that input signal from the deformable touch sensor satisfies the predetermined touch input criterion, energizing one or more motors integrated with the autonomous vehicle, thereby enabling flight operations.

2. The method of claim 1, wherein the autonomous vehicle comprises a plurality of deformable touch sensors and determining that the input signal from the deformable touch sensor satisfies the predetermined touch input criterion further comprises:
determining that the input signal received from one deformable touch sensor of the plurality of deformable touch sensors satisfies the predetermined touch input criterion.

3. The method of claim 1, wherein the autonomous vehicle comprises a first deformable touch sensor and a second deformable touch sensor and determining that the input signal from the deformable touch sensor satisfies the predetermined touch input criterion further comprises:
determining that the input signal received from the first deformable touch sensor satisfies the predetermined touch input criterion.

4. The method of claim 1, wherein the autonomous vehicle comprises a number of deformable touch sensors equal to a number of motors integrated with the autonomous vehicle.

5. The method of claim 1, wherein determining the autonomous vehicle has been enabled for launching comprises:

determining that the autonomous vehicle has been rotated about an axis of the autonomous vehicle a fixed number of times.

6. The method of claim 1, wherein determining the autonomous vehicle has been enabled for launching comprises:
analyzing one or more images captured via an image sensor to detect a predetermined gesture as depicted in the one or more images.

7. The method of claim 1, wherein determining the autonomous vehicle has been enabled for launching comprises:
determining two or more launch enabling signals have been activated within a predetermined duration of time;
wherein a first launch enabling signal is activated upon determining that the autonomous vehicle has been rotated about an axis of the autonomous vehicle a fixed number of times;
wherein a second launch enabling signal is activated upon detecting a predetermined gesture as depicted in one or more images captured with an image senor;
wherein a third launch enabling signal is activated upon detecting a switch has been set from a first position to a second position.

8. The method of claim 1, further comprising:
subsequent to determining the autonomous vehicle has been enabled for launching, activating an indicator light.

9. An autonomous vehicle comprising:
hardware processing circuitry;
one or more hardware memories storing instructions that when executed configure the hardware processing circuitry to perform operations comprising:
within a predetermined amount of time after determining the autonomous vehicle has been enabled for launching:
determining that an input signal received from an accelerometer satisfies a predetermined acceleration criterion;
determining that an input signal from a deformable touch sensor satisfies a predetermined touch input criterion, the input signal from the deformable touch sensor resulting from a change in shape of the touch sensor; and
in response to determining that the input signal received from the accelerometer satisfies a predetermined acceleration criterion and determining that that input signal from the deformable touch sensor satisfies a predetermined touch input criterion, energizing one or more motors integrated with the autonomous vehicle, thereby enabling flight operations.

10. The autonomous vehicle of claim 9, wherein the deformable touch sensor is one of a plurality of deformable touch sensors.

11. The autonomous vehicle of claim 9, wherein the deformable touch sensor is one of two deformable touch sensors.

12. The autonomous vehicle of claim 10, wherein a number of deformable touch sensors is equal to a number of motors integrated with the autonomous vehicle.

13. The autonomous vehicle of claim 9, wherein determining the autonomous vehicle has been enabled for launching comprises:
determining that the autonomous vehicle has been rotated about an axis of the autonomous vehicle a fixed number of times.

14. The autonomous vehicle of claim 9, wherein determining the autonomous vehicle has been enabled for launching comprises:
analyzing one or more images captured via an image sensor to detect a predetermined gesture as depicted in the one or more images.

15. The autonomous vehicle of claim 9, wherein determining the autonomous vehicle has been enabled for launching comprises:
determining two or more launch enabling signals have been activated within a predetermined duration of time;
wherein a first launch enabling signal is activated upon determining that the autonomous vehicle has been rotated about an axis of the autonomous vehicle a fixed number of times;
wherein a second launch enabling signal is activated upon detecting a predetermined gesture as depicted in one or more images captured with an image senor;
wherein a third launch enabling signal is activated upon detecting a switch has been set from a first position to a second position.

16. The autonomous vehicle of claim 9, further comprising:
subsequent to determining the autonomous vehicle has been enabled for launching, activating an indicator light.

17. A non-transitory computer readable storage medium comprising instructions that, when executed configure hardware processing circuitry to perform operations for controlling an autonomous vehicle, the operations comprising:
determining that an input signal received from an accelerometer satisfies a predetermined acceleration criterion while simultaneously determining that an input signal from a deformable touch sensor satisfies a predetermined touch input criterion, the input signal from the deformable touch sensor resulting from a change in shape of the deformable touch sensor; and
in response to determining that the input signal received from the accelerometer satisfies the predetermined acceleration criterion while simultaneously determining that that input signal from the deformable touch sensor satisfies the predetermined touch input criterion, energizing one or more motors integrated with the autonomous vehicle, thereby enabling flight operations.

* * * * *